Sept. 15, 1970 SHINNOSUKE FUNAKUBO ET AL 3,528,152
BAND-TYPE FILE
Filed March 8, 1967 2 Sheets-Sheet 1
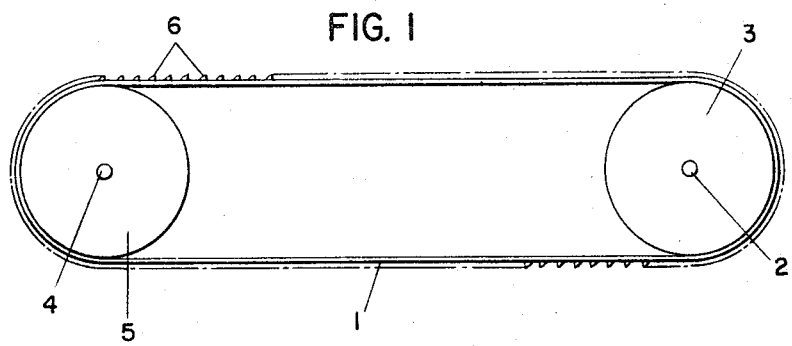
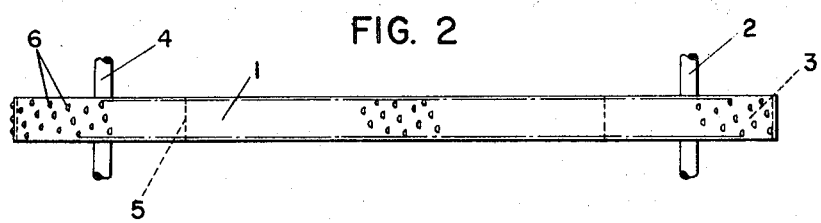
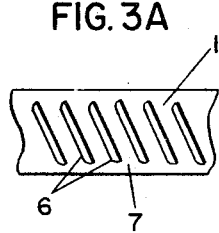 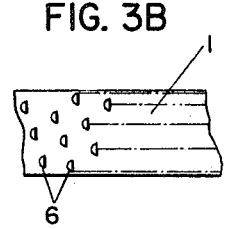 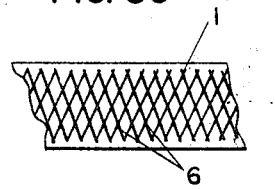
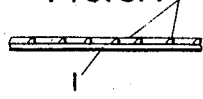 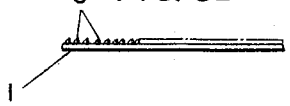 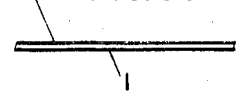
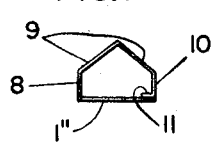   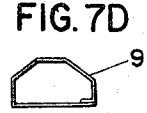
INVENTORS:
SHINNOSUKE FUNAKABO, TOSHIO SAITO
BY Jacob L. Kollin
ATTORNEY

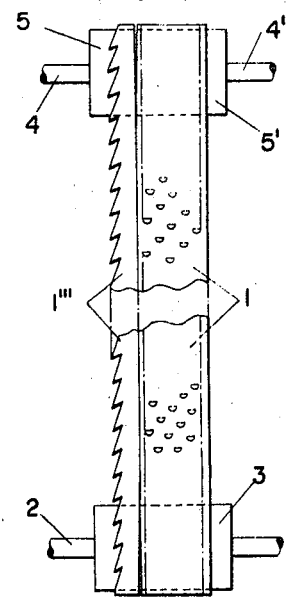
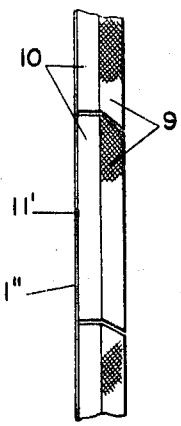
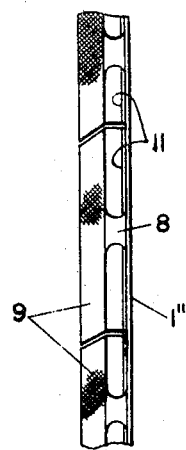
FIG. 4  FIG. 5A  FIG. 5B  FIG. 5C
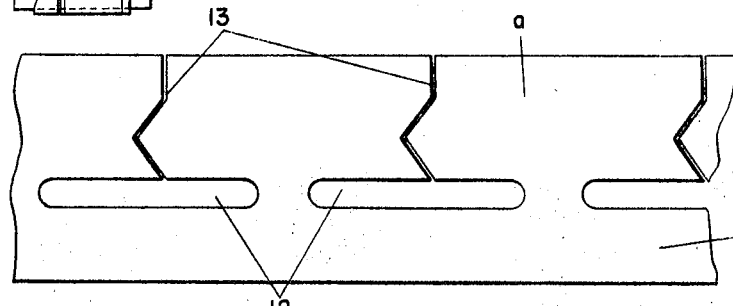
FIG. 6A
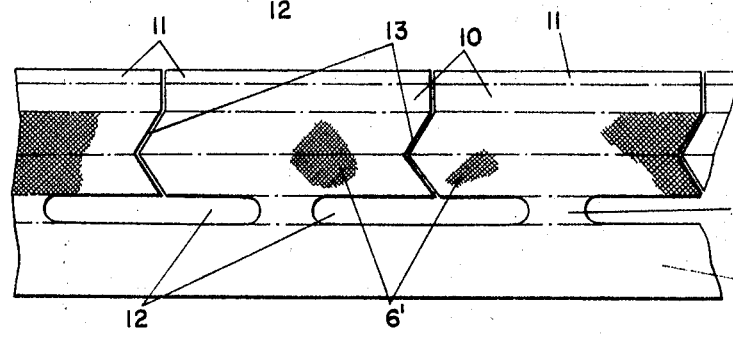
FIG. 6B
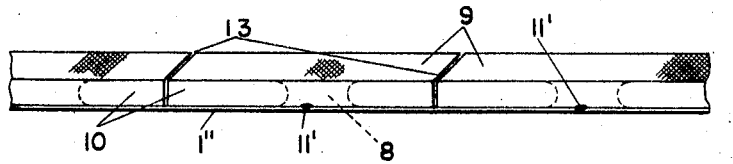
FIG. 6C United States Patent Office 3,528,152
Patented Sept. 15, 1970

3,528,152
BAND-TYPE FILE
Shinnosuke Funakubo, 19 3-chome Fukagawa Takabashi Koto-ku, Tokyo, Japan, and Toshio Saito, 543 Oaza Okimachiya, Musashi-machi, Irima-gun, Saitama, Japan
Filed Mar. 8, 1967, Ser. No. 621,640
Claims priority, application Japan, Mar. 17, 1966, 41/16,084; Dec. 9, 1966, 41/80,532
Int. Cl. B23d 71/00
U.S. Cl. 29—78                                                    1 Claim

ABSTRACT OF THE DISCLOSURE

The disclosure of the present application might be abstracted as related to a novel file consisting of a metallic band having a griding surface with teeth or grains which is integral with said bond, and a band saw type filing machine mounted with such novel file.

BRIEF SUMMARY OF THE INVENTION

While the apparatus or method for filing or scraping the surface of the work to a finish by rotating a disc or drum mounted on its circumferential surface with metal or paper file has so far been known, it is a matter of great difficulty to finish the surface of the work to a true horizontal plane by such apparatus or method, and the finished surface tends to deviate from true flatness. Consequently, when finishing the surface of the work to a true horizontal plane, it is necessary to have the diameter of such disc or column enlarged to a considerable extent. Moreover, a filing machine using a file mounted on the circumferential surface of such a disc or drum usually requires a complex mechanism such as provision of controlled wheels mounted in opposition to said disc or drum for clamping the work cooperatively with said disc or drum. On the other hand, a band-type file of the present invention placed on two supporting wheels mounted at some distance apart has a straight filing or scraping face for the greater part of its track and hence may be brought into contact with the work over an extensive range of its track on the straight or horizontal plane. Thus the difference caused between the present band-type file and the conventional drum type file as to their griding or buffing speeds may be likened to that between a band saw and a circular saw.

The apparatus or method for filing or scraping the surface of the work to a finish by reciprocating a file with a griding surface along a straight line, has also been known. However, from the standpoint of engineering, it is an impossibility in such device to set on the file face the teeth projecting with an angle in the one direction by means of a punch or the like as in the case of the present invention file band since the reciprocating motion of the filing or scraping face on the surface of the work results in the clearance and useless cutting resistance between the filing or scraping face and the work. Moreover, there is a drawback that metal chips or wood scrapings or the like clogged between the teeth in their reciprocating movements cannot be readily removed, with the result that the speed and effectiveness of draw filing or scraping actions are lowered.

On the other hand, the file band according to the present invention is moved in one direction under predetermined tension over the driving and driven wheels, so it is possible to set teeth projecting in one direction on the filing or scraping face and at a proper cutting angle relative to the work to cut the work in a true horizontal direction as in the case of the cutting edge of a planer, with the result that the surface of the work may be filed or scraped to a smooth finish. Moreover, there is a further advantage that metal chips or wood scrapings clogged between the grains may be thrown off as the file band is subjected to a whittling action, though to a very limited extent, while the same is travelling on the driving or driven wheels.

Metal chips or wood scrapings adhered to the file may also be removed in a simple manner according to the present filing machine with a band-type file by the provision of suction means adjacent its support wheels and/or its straight track.

While a belt sander making use of paper file or emery cloth is also a known device, it is impossible in this device to place paper file or emery cloth on the supporting wheels under strong tension as in the case of the present invention band-type file, and apparently such device cannot rival with the present invention file in point of durability of the face of the file.

With a view to compensating such deficiencies of the belt sander using a paper file or emery cloth, a belt sander having a plurality of file units, each with a rectangular shape, has been developed, but it usually requires a complicated means to mount file units on the metal belt and, because of the necessity of providing such complicated mounting means to a file unit, said file unit has to be a solid file as an ordinary hand flat file, while its overall weight also has to be increased. On the other hand, the present invention bandtype file does not require such complicated mounting means, while its weight is approximately equal to the weight of a conventional band saw blade and, when in use, it may be mounted in an ordinary band sawing device.

Hence, it is a principal object of the present invention to provide a novel file consisting of a metallic band having a griding surface formed with teeth or grains integral with the band, which is simple in make, low in production cost and endowed with improved griding speed and efficiency.

Other objects will become apparent from the following description of the invention made in conjunction with the accompanying drawings.

BRIEF DESCRIPTION OF THE ACCOMPANYING DRAWINGS

FIG. 1 is a side view showing a band-type file according to the present invention when mounted on band saw wheels;

FIG. 2 is a plan view of FIG. 1;

FIGS. 3(A), 3(B) and 3(C) are plan views showing the grains or rows of teeth cut on the file;

FIGS. 3(A'), 3(B') and 3(C') are side views of FIGS. 3(A), 3(B) and 3(C);

FIG. 4 is an explanatory front view showing the present file as it is used with a band saw blade;

FIG. 5(A) is a plan view, FIG. 5(B) is a side view, as seen from the left, and FIG. 5(C) is a side view, as seen from the right, of a further embodiment of the present file band respectively;

FIGS. 6(A), 6(B) and 6(C) are explanatory views showing its production process; and FIGS. 7(A), 7(B), 7(C) and 7(D) are vertical sectional views showing various griding surfaces.

DETAILED DESCRIPTION

Explaining the construction of the present invention band-type file especially with reference to FIGS. 1 and 2, a band file 1 consisting of a metal strap joined at its ends to form a continuous or endless band and formed on its surface with a plurality of grains 6 set in a predetermined direction is placed under the necessary tension on the driving wheel 3 driven by a driving shaft 2 of the band sawing device and the driven wheel 5 having a shaft 4 and movable by the medium of band-tension control means.

The metal strip making up the file band 1 is the cold rolled band steel and such band steel may be hardened after the teeth 6 are cut on its face, or an originally hardened steel strip having bainite structure such as Sandvik hardflex. In any case, the material of said metal strap must be of the type which is wear-resistant and excellent in its spring characteristics, or can be subjected to the treatment such that it may be endowed with such properties. Grains 6 are set by a hand-operated punch or a machine punch in the predetermined direction, and the angles of grains as set may be varied to suit the material of the work to be machined or scraped. In like manner, setting of grains or cutting of the rows of teeth may be made in a variety of ways to suit the material of the work to be machined or scraped.

FIG. 3 shows various types of grains used in actual filing. In this figure, (A) (A') show the grains and the set of grains especially suited for buffing of leather, and (B) (B') and (C) (C') show the grains and the set of grains suited for finishing synthetic resin and metal articles respectively.

Grains or teeth are not cut on both edges 7 of the present file band extending in its longitudinal direction and these edges 7 may preferably be subjected to the hard chrome plating treatment. Strong tension is placed on these edges 7 when the present file band is mounted on its supporting wheels. The tension placed on said edges 7 is strongest when the band is travelling on the driving and driven wheels, so that the band portion provided with teeth 6 is raised a little at this time to shake off the chips or scrapings clogged between its rows of teeth.

It may be noted that by having the file band surface itself formed into the curvilinear shape or into the desired square shapes, or by having said safe edges hardened specifically, the present file band may be imparted the effects similar to those attained by the half-round file, round file, square file or triangular file.

If, as shown in FIG. 4, the present file band is used as a support member 1 for blade member 1''' of relatively small width mounted on a band sawing device (U.S. Pat. No. 3,304,968) provided with two driven wheels 4, 4', the axes of which are separately or individually adjustable, it may be used as an entirely novel band saw capable of cutting the work and filing or scraping the cut surfaces to a finish at the same time. In this instance, preferably the thickness of the present file band is substantially equal to or less than the width of the kerf cut on the work by the blade member 1'''.

FIGS. 5 to 7 show a further embodiment of the band-type file as illustrated in FIGS. 1 to 4. In this embodiment, a band made from one-piece steel plate and joined at its opposite ends to form a continuous or endless band tool has its griding surface carried by an upstanding member of narrow width and a supporting member both formed integral with the band, said supporting member being brazed to the opposite edge of the band at a location corresponding to the oppositely provided upstanding member 8. Such band file is most suitable for draw filing of metallic articles. By machining a one-piece quenchable steel strip or a hardened steel strip of the bainite structure, a griding surface 9 having grains or teeth 6 thereon is formed on one side of an upstanding member 8 of narrow width formed integral with the strip and supporting member 10 is then formed integral with and adjacent the griding surface 9. Furthermore, the base plate member 11 of narrow width is formed integral with and adjacent said supporting member 10, and said members 8, 9, 10, 11 are then bent inwardly sequentially. Then, the base plate member 11 is brazed to the opposite edge 11' of the strip. The strip is finally looped by joining their ends together to form a band.

More particularly, as illustrated in FIG. 6, on a steel plate $a$ of high grade quenchable carbon steel or special steel are punched an oblong hole 12 of the desired shape and a cut 13 connecting to said hole by means of press operation (FIG. 6(A)). Grains or teeth 6' are then cut on the griding surface 9 (FIG. 6(B)) and steel plate $a$ is then bent along the dotted lines of FIG. 6(B) by means of a roller so that the base plate portion 11 and the opposite lateral edge of the strip 1' are overlapped together (FIG. 6(C)). The base plate member 11 is then part welded to the strip 1' at a location corresponding to the oppositely provided upstanding member 8. The grains or teeth 6' are then subjected to a hardening process, such as quenching or fusing of tungsten carbide powders thereto, and the opposite ends of the strip are then joined.

The shape of cross section of griding surface 9 may be triangular, flat, round or trapezoidal in accord with the various shapes of the surfaces of the work to be machined or scraped, while grains 6' are set in a predetermined direction and their cutting angle may be determined in a variety of ways to suit the material of the particular work.

The cuts 13 are shaped at an angle relative to a predetermined direction (i.e. the advancing direction of the band) to reduce the resistance encountered when the griding surface 9 hits the work to be machined or scraped.

We claim:

1. An endless band-type profile shaping file formed from a single strip of sheet material comprising, a first strip portion having finite sides and formed together at its ends to form an endless band and a plurality of profile-shaping element portions having cutting teeth and being arranged in end to end relationship in the longitudinal direction of said band to extend parallel to said first strip portion and said strip portion being connected to said profile shaping element portions by limitedly engaging dependent upright member portions formed integral with said profile element portions, such that when the said band is normally operated around spaced wheels, the profile-shaping element portions will flex in a tangential manner around the wheels and allow shaping of materials to take place along straight portions of the said endless band type file.

References Cited

UNITED STATES PATENTS

| 289,104 | 11/1883 | How | 29—78 |
| 2,243,757 | 5/1941 | Kohls et al. | 29—79 |
| 2,355,602 | 8/1944 | Testo | 29—76 |
| 2,372,553 | 3/1945 | Coddington | 29—78 |
| 2,708,376 | 5/1955 | Booth | 29—78 X |
| 2,982,005 | 5/1961 | Booth | 29—78 X |

FOREIGN PATENTS

| 144,430 | 12/1951 | Australia. |
| 574,299 | 12/1945 | Great Britain. |
| 770,329 | 3/1957 | Great Britain. |

HARRISON L. HINSON, Primary Examiner